United States Patent
Yamamoto et al.

(10) Patent No.: US 10,613,062 B2
(45) Date of Patent: Apr. 7, 2020

(54) MASS SPECTROMETER

(71) Applicant: SHIMADZU CORPORATION, Kyoto-shi, Kyoto (JP)

(72) Inventors: Yoshitake Yamamoto, Kyoto (JP); Hideki Yamamoto, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/768,157

(22) PCT Filed: Oct. 15, 2015

(86) PCT No.: PCT/JP2015/079114
§ 371 (c)(1),
(2) Date: May 30, 2018

(87) PCT Pub. No.: WO2017/064783
PCT Pub. Date: Apr. 20, 2017

(65) Prior Publication Data
US 2018/0313794 A1 Nov. 1, 2018

(51) Int. Cl.
*G01N 30/72* (2006.01)
*G01N 30/86* (2006.01)
*G01N 30/02* (2006.01)

(52) U.S. Cl.
CPC ......... *G01N 30/72* (2013.01); *G01N 30/8637* (2013.01); *G01N 2030/027* (2013.01)

(58) Field of Classification Search
CPC .. H01J 49/004; H01J 49/0031; H01J 49/0036; H01J 49/0081; H01J 49/4265;
(Continued)

(56) References Cited

U.S. PATENT DOCUMENTS

2006/0284067 A1* 12/2006 Senko ................ G01N 30/8603
250/282
2014/0339422 A1* 11/2014 Niwa ...................... G01N 30/72
250/287

FOREIGN PATENT DOCUMENTS

CN 103946950 A 7/2014
EP 2 779 208 A1 9/2014
(Continued)

OTHER PUBLICATIONS

Written Opinion for PCT/JP2015/079114 dated Jan. 12, 2016 [PCT/ISA/237].
(Continued)

*Primary Examiner* — David E Smith
*Assistant Examiner* — Hsien C Tsai
(74) *Attorney, Agent, or Firm* — Sughrue Mion, PLLC (57) ABSTRACT

A signal intensity based on a total ion current signal or the like is calculated from mass spectra obtained by a normal mode of mass spectrometric analysis. When the signal intensity has exceeded an intensity threshold, the beginning time T0 of a chromatogram peak is estimated from that signal intensity as well as one or more previous signal intensities. An $MS^2$ execution permission-beginning time Ts is calculated by adding, to the beginning time T0, a delay time Tdelay determined front a half-value width of the peak estimated according to an LC separation condition. At or after the point in time where the actual time passes Ts, a peak which satisfies a precursor-ion selection condition is selected on a mass spectrum obtained by the mass spectrometric analysis. Then, an $MS^2$ analysis with the m/z of the selected peak as the target is immediately performed to obtain an $MS^2$ spectrum. By appropriately determining the delay time Tdelay, a high-sensitivity $MS^2$ spectrum for a target component can be obtained when the concentration of the target component has become sufficiently high, and the
(Continued)

accuracy of a qualitative determination or structural analysis of the component is thereby improved.

13 Claims, 4 Drawing Sheets

(58) Field of Classification Search
CPC .............. G01N 30/72; G01N 30/8603; G01N 30/8693; G01N 30/8696
See application file for complete search history.

(56) References Cited

FOREIGN PATENT DOCUMENTS

| | | | |
|---|---|---|---|
| JP | 2007-309661 | A | 11/2007 |
| JP | 2008-298427 | A | 12/2008 |
| JP | 2012-225862 | A | 11/2012 |
| WO | 2013/076826 | A1 | 5/2013 |

OTHER PUBLICATIONS

International Preliminary Report on Patentability PCT/JP2015/079114 dated Jan. 12, 2016 [PCT/IB/373].
Extended European Search Report dated Sep. 18, 2018 issued by the European Patent Office in counterpart application No. 15906247.0.

* cited by examiner

Fig. 4B CALCULATION OF MS SIGNAL INTENSITY

Fig. 5

| | | KIND OF MOBILE PHASE | | GRADIENT CONDITIONS | | | | |
|---|---|---|---|---|---|---|---|---|
| COL-UMN | FLOW VELOC-ITY | MOBILE PHASE A | MOBILE PHASE B | START % | END % | BEGINN-ING TIME | ENDING TIME | HALF-VALUE WIDTH |
| a | 1 | WATER | ACN | 0 | 40 | 0 | 10 | 4 |
| a | 2 | WATER | ACN | 0 | 50 | 0 | 5 | 1 |
| b | 0.5 | WATER | MeOH | 0 | 50 | 0 | 20 | 3 |
| b | 1 | WATER | MeOH | 0 | 40 | 5 | 15 | 2 |
| c | 1 | WATER | EtOH | 2 | 45 | 5 | 20 | 2.5 |

Fig. 6

PARAMETERS OF CHANGE IN HALF-VALUE WIDTH

| COL-UMN | FLOW VELOC-ITY | MOBILE PHASE | BEGINNING PEAK | ENDING PEAK | RATIO OF CHANGE | BEGINNING HALF-VALUE WIDTH |
|---|---|---|---|---|---|---|
| a | 1 | ACN | 2 | 20 | 0.25 | 2 |
| a | 2 | ACN | 1 | 15 | 0.5 | 1.5 |
| b | 0.5 | MeOH | 4 | 20 | 0.6 | 3 |
| b | 1 | MeOH | 2 | 10 | 0.2 | 1 |
| c | 1 | EtOH | 5 | 25 | 0.4 | 2.5 |

MASS SPECTROMETER

CROSS REFERENCE TO RELATED APPLICATIONS

This application is a National Stage of International Application No. PCT/JP2015/079114, filed on Oct. 15, 2015.

TECHNICAL FIELD

The present invention relates to a mass spectrometer in which an ion having a specific mass-to-charge ratio m/z originating from a sample component is dissociated by a collision-induced dissociation (CID) or similar process, and the thereby generated product ions (fragment ions) are subjected to mass spectrometry. The mass spectrometer according to the present invention is particularly suitable for a chromatograph mass spectrometer in which a mass spectrometer is used as a detector for a liquid chromatograph (LC) or gas chromatograph (GC).

BACKGROUND ART

An MS/MS analysis or $MS^n$ analysis, which is a technique of mass spectrometry, is a useful technique for identifying a high-molecular compound and/or analyzing its chemical structure. In recent years, this technique has been widely used in various areas. A commonly known type of mass spectrometer for performing an MS/MS analysis is a triple quadrupole mass spectrometer including two quadrupole mass filters respectively placed before and after a collision cell in which a CID process is performed. A Q-TOF mass spectrometer, which has a time-of-flight mass analyzer in place of the rear quadrupole mass filter in the triple quadrupole mass spectrometer, is more complex in structure and more expensive than the triple quadrupole mass spectrometer yet is capable of acquiring more accurate mass spectra. With these types of mass spectrometers, an $MS^n$ analysis with n being two can be performed. Some types of mass spectrometers, such as an ion trap time-of-flight mass spectrometer in which an ion trap capable of holding ions is combined with a time-of-flight mass spectrometer, can perform an $MS^n$ analysis with n being equal to or greater than three by dissociating an ion having a specific mass-to-charge ratio in a plurality of stages in the ion trap. In the following description, a mass spectrometer capable of an $MS^n$ analysis with n being equal to or greater than two is simply called the mass spectrometer.

In such a mass spectrometer, for example, when an $MS^2$ spectrum for a target component needs to be obtained, it is normally necessary to previously set the mass-to-charge ratio of a precursor ion to be selected as the target in the measurement conditions. However, in the case of analyzing a sample which contains unknown components, it is impossible to previously set the mass-to-charge ratio of the precursor ion. To address this problem, a commonly known mass spectrometer is provided with the function of determining whether or not a peak which meets a precursor-ion selection condition previously set by an analysis operator is present on a mass spectrum obtained by a normal mode of mass spectrometry, and automatically performing an $MS^2$ analysis in real time using the ion corresponding the peak as the precursor ion if a peak which meets the aforementioned condition has been located. Such a function is called the "data dependent acquisition (DDA)" or "auto-$MS^n$ analysis" (see Patent Literature 1 or 2). In the present description, "DDA" is used to refer to this function.

As the precursor-ion selection condition in the DDA, the lower-limit threshold of the signal intensity is frequently used. In this case, if a peak whose signal intensity is equal to or higher than a previously set lower-limit threshold is detected on a mass spectrum obtained by a mass spectrometric analysis, an $MS^n$ analysis in which the ion corresponding to that peak is selected as the precursor ion will be performed. However, in that case, if there is an ion originating from a foreign substance which is abundantly present, such as the sample solvent, a useless $MS^2$ analysis in which that ion is selected as the precursor ion may be performed. Accordingly, the device described in Patent Literature 2 determines whether or not the signal intensity of a peak which appears on a mass spectrum falls within a range defined by the lower and upper limits specified by an analysis operator, and performs an $MS^2$ analysis using an ion corresponding to a peak whose signal intensity falls within that range. In this case, if the upper-limit value of the signal intensity is appropriately set, it is possible to avoid a component having a high signal intensity for which no $MS^2$ analysis is necessary, and thereby give priority to the $MS^2$ analysis of a component contained at a comparatively low concentration.

However, if a precursor-ion selection as just described is performed in an LC-MS or GC-MS using the previously described mass spectrometer as the detector for a liquid chromatograph (LC) or gas chromatograph (GC), the following problem occurs:

In an LC-MS or GC-MS, the concentration of the target component introduced into the mass spectrometer changes in a bell-like form with the passage of time. Therefore, if the lower limit of the signal intensity in the precursor-ion selection condition is set at an extremely low level, the $MS^2$ analysis will be performed at a point in time where the signal intensity of the target component is not sufficiently high. This may result in an $MS^2$ spectrum showing product ions with low signal intensities and causing a problem in the qualitative determination or structural analysis of the target component. This problem can be avoided by setting the lower limit of the signal intensity at a certain level. However, in that case, the $MS^2$ analysis for the target component may not be performed when the concentration of the target component is lower than expected and does not reach the lower limit of the signal intensity.

Furthermore, in the device described in Patent Literature 2, no $MS^2$ analysis will be performed for an ion if the signal intensity of the corresponding peak observed on the mass spectrum has exceeded the upper limit specified in the precursor-ion selection condition. This is mainly aimed at preventing the $MS^2$ analysis from being performed for a substance which is almost constantly introduced at a high concentration, such as a substance existing in the mobile phase used in an LC or a standard substance used for the mass correction of the mass spectrum. However, it may cause the problem that an $MS^2$ analysis for a substance which the analysis operator wishes to observe will not be performed if the substance is present at such a high concentration that the ions originating from that substance do not meet the precursor-ion selection condition.

CITATION LIST

Patent Literature

Patent Literature 1: JP 2007-309661 A
Patent Literature 2: JP 2008-298427 A

SUMMARY OF INVENTION

Technical Problem

The present invention has been developed in view of the previously described problems. Its primary objective is to provide a mass spectrometer capable of performing an $MS^n$ analysis by automatically selecting a precursor ion originating from a target component based on a mass spectrum obtained by a mass spectrometric analysis, where the $MS^n$ analysis can be performed at a point in time when the concentration of the target component is comparatively high, and a satisfactory $MS^n$ spectrum can be thereby obtained, even when the concentration of the target component temporally changes.

Another objective of the present invention is to provide a mass spectrometer capable of performing an $MS^n$ analysis in which an ion originating from a substance which an analysis operator wishes to observe is selected as the precursor ion when the substance is actually present at a high concentration, while preventing the $MS^n$ analysis from being performed for other unnecessary high-concentration substances, such as a substance present in the mobile phase used in an LC.

Solution to Problem

The present invention developed for solving the previously described problem is a mass spectrometer which determines a precursor ion based on $MS^{n-1}$ spectrum data obtained by an $MS^{n-1}$ analysis (where n is an integer equal to or greater than two) and performs an $MS^n$ analysis for the precursor ion subsequently to the $MS^{n-1}$ analysis, where the concentration of a component contained in a sample changes in a peak-like form with the passage of time when the sample is introduced, the mass spectrometer including:

a) a condition setter for allowing an analysis operator to set a precursor-ion selection condition;

b) a time determiner for determining a permission-beginning time at which permission to perform an $MS^n$ analysis for the component being analyzed at the time is given based on $MS^{n-1}$ spectrum data obtained by an $MS^{n-1}$ analysis during an execution of the analysis;

c) a time checker for comparing a current time with the permission-beginning time; and d) a precursor ion selector for selecting, as a precursor ion, a peak which meets the precursor-ion selection condition from the $MS^{n-1}$ spectrum data obtained by the $MS^{n-1}$ analysis, after it is determined by the time checker that the current time exceeds the permission-beginning time; and e) an analysis controller for controlling each relevant section to perform the $MS^n$ analysis for the precursor ion selected by the precursor ion selector.

For example, an LC or GC is connected to the mass spectrometer according to the present invention, and a sample containing components which have been temporally separated by the LC or GC is introduced into the mass spectrometer. Otherwise, a sample supplied by a flow injection analysis is introduced into the mass spectrometer. Thus, the concentration of the components contained in a sample changes in a peak-like form with the passage of time when the sample is introduced into the mass spectrometer.

Examples of the mass spectrometer according to the present invention include triple quadrupole mass spectrometers, Q-TOF mass spectrometers and other types of mass spectrometers capable of $MS^n$ analyses, as well as ion trap time-of-flight mass spectrometers, ion trap mass spectrometers and other types of mass spectrometers capable of $MS^n$ analyses with n being equal to or greater than three.

In the mass spectrometer according to the present invention, every time an $MS^1$ spectrum over a predetermined mass-to-charge-ratio range is obtained, for example, by a normal mode of mass spectrometry which includes no ion-dissociating operation, the time determiner calculates the signal intensity based on a total ion current (TIC) signal or base peak current (BPC) signal and determines the permission-beginning time for a component being analyzed at the time, based on that signal intensity. The "permission-beginning time" is the beginning point of the period of time during which permission is given to perform an $MS^n$ analysis subsequently to an $MS^{n-1}$ analysis for an ion originating from the component concerned. Preferably, the permission-beginning time for a peak may be set at a point in time where the signal intensity becomes equal to or higher a certain level relative to the signal intensity at the peak top of the peak.

In a conventional device, when a peak which meets the precursor-ion selection condition has been selected on an $MS^{n-1}$ spectrum, an $MS^n$ analysis using an ion corresponding to the selected peak as the precursor ion is immediately performed, i.e. subsequently to the $MS^{n-1}$ analysis. By comparison, in the mass spectrometer according to the present invention, the precursor ion selector waits for the time checker to determine that the current time exceeds the permission-beginning time and then selects a peak which meets the precursor-ion selection condition. The analysis controller subsequently performs an $MS^n$ analysis using the ion corresponding to the selected peak as the precursor ion. The checking of whether or not a peak which satisfies the precursor-ion selection condition is present may also be performed before the passage of the permission-beginning time. Even in that case, an operation which is essentially identical to the previously described one can be realized by deferring the execution of an $MS^n$ analysis until the passage of the permission-beginning time even when a peak which satisfies the precursor-ion selection condition has been located.

As one mode of the mass spectrometer according to the present invention, for example, the time determiner may include a peak-beginning point estimator for estimating the beginning point of a peak on a chromatogram which corresponds to a peak-like change of the concentration of the contained components with the passage of time based on data of a plurality of $MS^{n-1}$ spectra continuously obtained in temporal sequence, and designate, as the permission-beginning time, a point in time at which a predetermined delay time elapses from the beginning point of the peak.

For example, as in the case of detecting a component in a sample separated by an LC or GC, if the signal intensity changes in a peak-like form with the passage of time, the width of the peak varies depending on the separation conditions. Therefore, in the previously described configuration, in order to give permission to the execution of the $MS^n$ analysis when the signal intensity becomes equal to or higher a certain level relative to the signal intensity at the peak top, the delay time may be appropriately adjusted according to the width of the peak. That is to say, the time determiner may determine the delay time based on an estimated value of a half-value width of the peak on the chromatogram.

The half-value width of a peak on a chromatogram in an LC or GC varies depending on the kind of mobile phase, its flow velocity and other separation conditions. Accordingly, in the case of a configuration in which a chromatograph, such as an LC or GC, is connected to the front end of the mass spectrometer, the time determiner may further include a half-value width estimator for estimating the half-value width of a peak on a chromatogram based on a separation condition in the chromatograph. In an LC-MS or GC-MS including an LC or GC combined with a mass spectrometer, it is common that such a separation condition is previously set by a user as one of the measurement conditions. Accordingly, the half-value width of a peak on a chromatogram can be estimated by using a separation condition previously set as a part of the measurement conditions.

In many cases, the shape of a peak waveform of a chromatogram can be approximated by a Gaussian distribution. Accordingly, after a plurality of signal intensities in the base portion on the rising side of the peak have been known, it is possible to estimate the half-value width of the peak with a certain level of accuracy. Accordingly, the time determiner may further include a half-value width estimator for estimating the half-value width of a peak on a chromatogram based on data of a plurality of $MS^{n-1}$ spectra.

By this configuration, the half-value width of a peak can be estimated with a certain level of accuracy without using information set by users or other additional information. Accordingly, the $MS^n$ analysis can always be performed while the signal intensity is at certain levels.

In the mass spectrometer according to the present invention, the peak-beginning point estimator may estimate the peak-beginning point when the signal intensity calculated based on the $MS^{n-1}$ spectrum data exceeds a predetermined threshold, based on the signal intensity concerned as well as one or more signal intensities calculated based on earlier $MS^{n-1}$ spectrum data.

As another mode of the mass spectrometer according to the present invention, the time determiner may estimate the curve of the rising portion of a peak on a chromatogram which corresponds to a peak-like change of the concentration of the contained components with the passage of time based on data of a plurality of $MS^{n-1}$ spectra continuously obtained in temporal sequence, locate an inflection point on the curve, and designate the point in time of the inflection point as the permission-beginning time.

An inflection point on the curve in the rising portion of a chromatogram peak normally appears when the signal intensity has become equal to or higher than a certain level relative to the signal intensity at the peak top of the peak concerned. Accordingly, an $MS^n$ analysis using an ion with a sufficient intensity as the precursor ion can be performed by designating the inflection point as the permission-beginning time.

In one preferable configuration of the mass spectrometer according to the present invention, the precursor-ion selection condition includes, as one item, excluded ion information which shows an ion or mass-to-charge ratio to be excluded; and the time determiner determines the permission-beginning time after excluding data corresponding to the excluded ion information from $MS^{n-1}$ spectrum data obtained by an $MS^{n-1}$ analysis.

For example, the time determiner may create, in real time, a chromatogram which corresponds to a peak-like change of the concentration of the contained components with the passage of time after excluding the data corresponding to the excluded ion information from the $MS^{n-1}$ spectrum data, and then use the chromatogram as a basis for determining the permission-beginning time to give permission to the execution of the $MS^n$ analysis for the component being analyzed at the time.

Typically, the excluded ion information may be prepared so as to exclude ions originating from foreign substances which will be observed with high signal intensities. Specifically, in the case where an LC is connected to the front end of the mass spectrometer according to the present invention, the excluded ion information may be prepared so as to exclude ions originating from the components contained in the mobile phase used in the LC. In the case where a standard substance used for the mass correction or other purposes is continuously mixed in the sample, the excluded ion information may be prepared so as to exclude ions originating from the standard substance.

This configuration makes it possible to avoid execution of the $MS^n$ analysis for components which are previously known to be unnecessary, and thereby increase the probability of the $MS^n$ analysis to be performed for a target component which the user wishes to observe.

Advantageous Effects of the Invention

With the mass spectrometer according to the present invention, an $MS^n$ analysis for a target sample whose concentration changes in a peak-like form with the passage of time can be performed at a point in time where the concentration of the target component has been comparatively high. As a result, a satisfactory $MS^n$ spectrum which shows product ions with high intensities can be obtained.

In a preferable mode of the mass spectrometer according to the present invention, it is possible to avoid execution of an $MS^n$ analysis for unnecessary components, such as a component present in the mobile phase used in an LC, and thereby increase the probability of the $MS^n$ analysis to be performed for a target component which the user actually wishes to observe.

DESCRIPTION OF EMBODIMENTS

Figure 1:
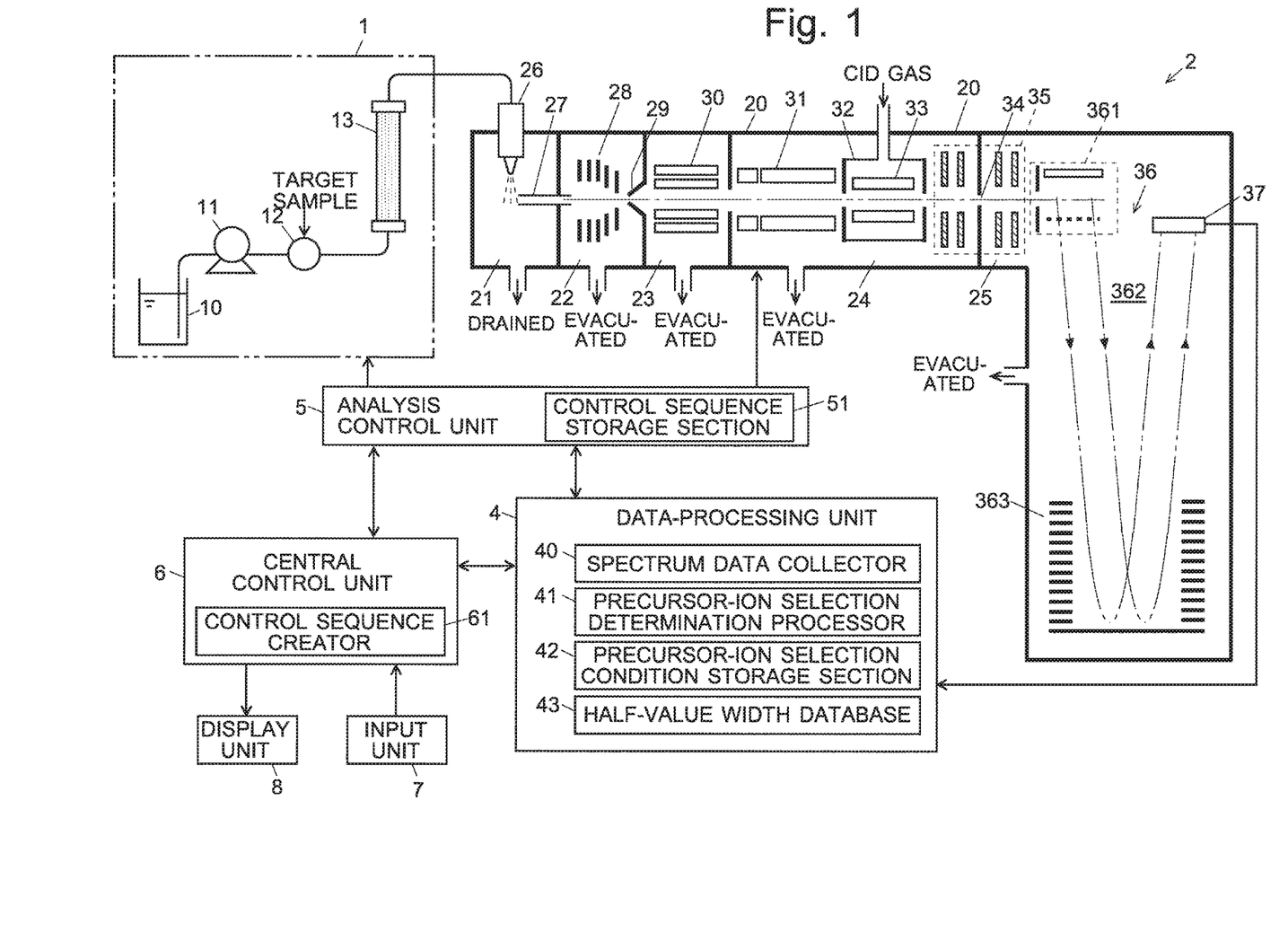
FIG. 1 is a configuration diagram of the main components of one embodiment of an LC-MS using a mass spectrometer according to the present invention.

A liquid chromatograph mass spectrometer (LC-MS) as one embodiment of the present invention is hereinafter described with reference to the attached drawings. FIG. 1 is a configuration diagram of the main components of the LC-MS in the present embodiment.

In an LC unit 1, a liquid-sending pump 11 draws a mobile phase (solvent) from a mobile phase container 10 and sends it to an injector 12 at a constant flow velocity. A sample liquid injected into the mobile phase at a predetermined timing in the injector 12 is carried by the flow of the mobile phase into a column 13. While passing through the column 13, the various components contained in the sample liquid are separated from each other and eluted. This eluate containing the separated components is supplied to the ion source of a mass spectrometer unit 2, which is a Q-TOF mass spectrometer.

The mass spectrometer unit 2 has a chamber 20, which contains an ionization chamber 21, first intermediate vacuum chamber 22, second intermediate vacuum chamber 23, first analysis chamber 24, and second analysis chamber 25, with their degrees of vacuum sequentially increased from the ionization chamber 21 maintained at a substantially atmospheric pressure to the second analysis chamber 25 maintained in a high-vacuum state. That is to say, the mass spectrometer unit 2 has the configuration of a multi-stage differential pumping system. An ESI spray 26 which performs ionization by an electrospray ionization (ESI) method is provided as the ion source within the ionization chamber 21. The ionization chamber 21 communicates with the first intermediate vacuum chamber 22 through a heated desolvation tube 27. The first and second intermediate vacuum chambers 22 and 23 respectively contain ion guides 28 and 30 for transporting ions to the subsequent stage while converging them. The first intermediate vacuum chamber 22 communicates with the second intermediate vacuum chamber 23 through the small hole formed at the apex of a skimmer 29.

The first analysis chamber 24 contains a quadrupole mass filter 31 and a collision cell 32 having a multipole ion guide 33 provided inside. The second analysis chamber 25 contains an orthogonal acceleration reflectron time-of-flight mass analyzer 36 and an ion detector 37. The time-of-flight mass analyzer 36 includes an orthogonal accelerator 361, flight space 362, and reflector 363. An ion guide 35 is provided between the collision cell 32 and the orthogonal accelerator 36. An ion passage hole 34 formed in the partition wall between the first and second analysis chambers 24 and 25 is sandwiched in the middle of the ion guide 35.

An analysis control unit 5 includes a control sequence storage section 51. This unit controls the operation of each section included in the LC unit 1 and the mass spectrometer unit 2 to perform a measurement which will be described later. A data-processing unit 4 receives detection signals from the ion detector 37. This unit includes a spectrum data collector 40, precursor-ion selection determination processor 41, precursor-ion selection condition storage section 42, half-value width database 43 and other functional blocks characteristic of the device in the present embodiment. A central control unit 6, which includes a control sequence creator 61 as a functional block, is responsible for the general control of the entire system as well as the input/output control through an input unit 7 and a display unit 8.

The analysis control unit 5 is typically configured using, as its main component, a microcomputer having a CPU, RAM, ROM, timer and other elements, and is embedded in the main unit of the apparatus including the LC unit 1 and mass spectrometer unit 2. On the other hand, the functions included in the central control unit 6 and the data-processing unit 4 can be partially or entirely realized by executing, on a personal computer (or workstation) connected to the main unit of the apparatus, a dedicated software program installed on the same computer.

A schematic operation in the process of performing an $MS^2$ measurement in the mass spectrometer unit 2 is as follows:

An eluate from the column 13 in the LC unit 1 is introduced into the ESI spray 26. The ESI spray 26 atomizes the eluate into the ionization chamber 21 while imparting an imbalanced polarity of electric charges to the eluate. The electrically charged droplets come in contact with the atmospheric gas and become broken into smaller sizes, causing the solvent in the droplets to vaporize. Through this process, the components in the droplets are ionized. The generated ions are transported through the desolvation tube 27, ion guides 28 and 30 into the quadrupole mass filter 31. A voltage which allows only an ion having a specific mass-to-charge ratio to pass through is applied to the rod electrodes forming the quadrupole mass filter 31. Thus, only an ion having a specific mass-to-charge ratio among the various ions originating from the sample components is selectively allowed to pass through the quadrupole filter 31 and be introduced into the collision cell 32 as the precursor ion.

During an $MS^2$ analysis, a CID gas, such as helium or argon, is introduced into the collision cell 32. Upon coming in contact with the CID gas, the precursor ion undergoes dissociation, whereby product ions are generated. The generated product ions are transported through the ion guide 35 into the orthogonal accelerator 361. The orthogonal accelerator 361 accelerates the stream of ions in a pulsed fashion in a direction substantially orthogonal to the stream at predetermined intervals of time, to send the ions into the flight space 362. The flight space 362 has neither an electric field nor a magnetic field except for the reflecting electric field created by the reflector 363. After being ejected from the orthogonal accelerator 361 and flying through the field-free flight space 362, the ions are returned by the reflecting electric field and once more fly through the flight space 362, to eventually reach the ion detector 37. Ions which began their flight at almost the same point in time are separated from each other according to their mass-to-charge ratios during their flight and sequentially arrive at the ion detector 37 in ascending order of the mass-to-charge ratio.

Accordingly, in the data-processing unit 4, a time-of-flight spectrum which shows the relationship between the time of flight and signal intensity of each ion (product ion) can be obtained, with the point of acceleration of the ions in the orthogonal accelerator 361 (i.e. the point in time when the ions began their flight) defined as a time-of-flight value of zero, based on the detection signals obtained from the ion detector 37. The relationship between the mass-to-charge ratio and time of flight can be theoretically or experimentally determined beforehand. Based on this relationship, the time of flight can be converted into mass-to-charge ratio to obtain an $MS^2$ spectrum from the time-of-flight spectrum. An $MS^2$ spectrum covering a predetermined mass-to-charge-ratio range can be obtained every time the ions are accelerated in a pulsed fashion in the orthogonal accelerator 361. By repeating this operation at predetermined intervals of time, an $MS^2$ spectrum can be obtained for each of the various components which sequentially emerge in the eluate with the passage of time while the eluate is being introduced from the LC unit 1 into the mass spectrometer unit 2.

The thereby obtained MS$^2$ spectrum is substantially identical to a product ion spectrum obtained by performing a scan measurement over a predetermined mass-to-charge-ratio range with a rear quadrupole mass filter in a triple quadrupole mass spectrometer (product ion scan measurement).

As just described, an MS$^2$ spectrum for a specific precursor ion originating from a sample component can be obtained in the mass spectrometer unit 2. Furthermore, a mass spectrometric analysis similar to the one performed by a normal type of time-of-flight mass spectrometer which is not the Q-TOF type can also be performed to obtain a mass spectrum by omitting the selection of the precursor ion from the ions originating from the sample component by the quadrupole mass filter 31 (i.e. by allowing all ions to pass through) as well as omitting the ion-dissociating operation in the collision cell 32.

Figure 2:
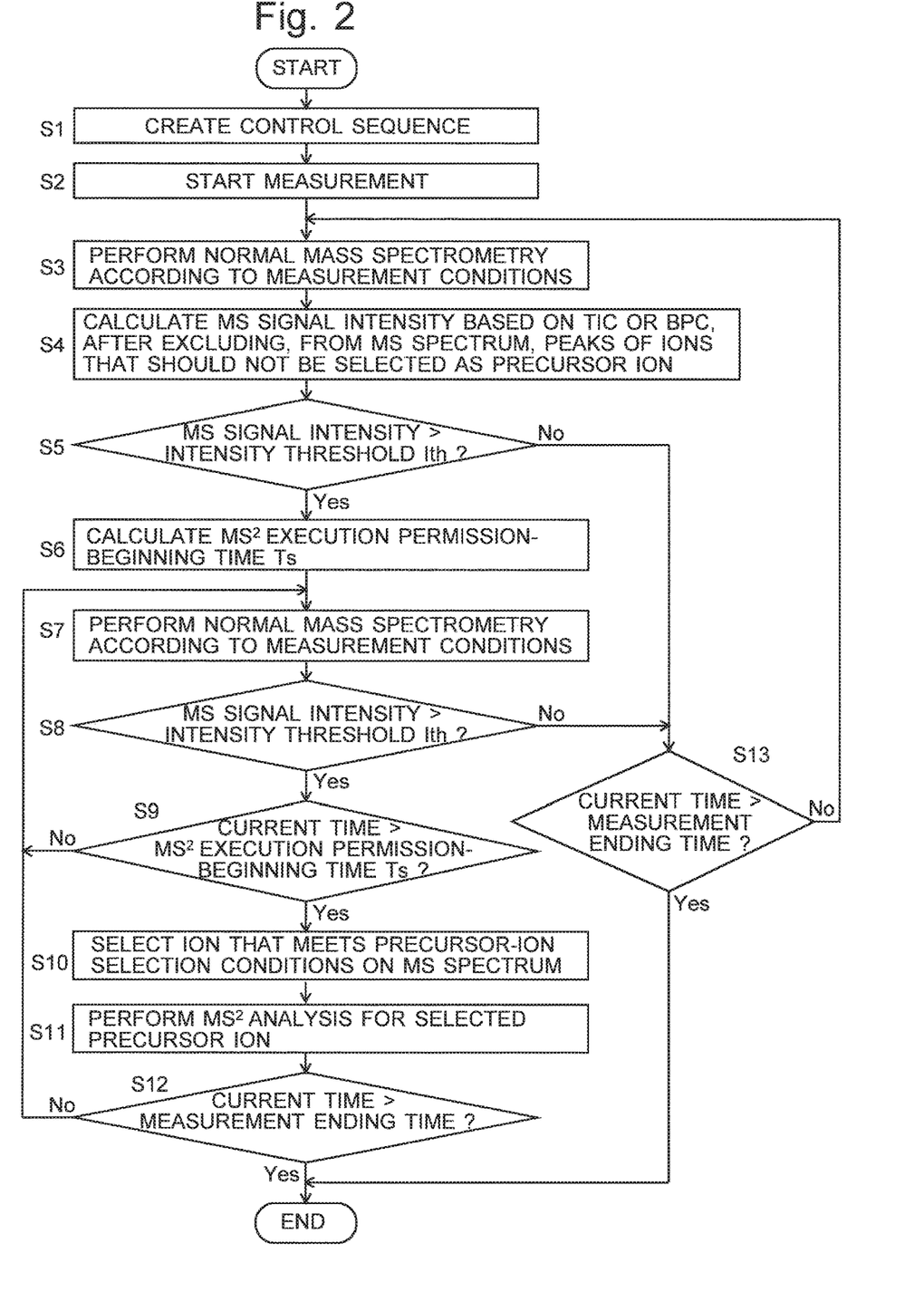
FIG. 2 is a flowchart showing one example of the processing operation in the process of collecting data by DDA in the LC-MS in the present embodiment.
Figure 3:
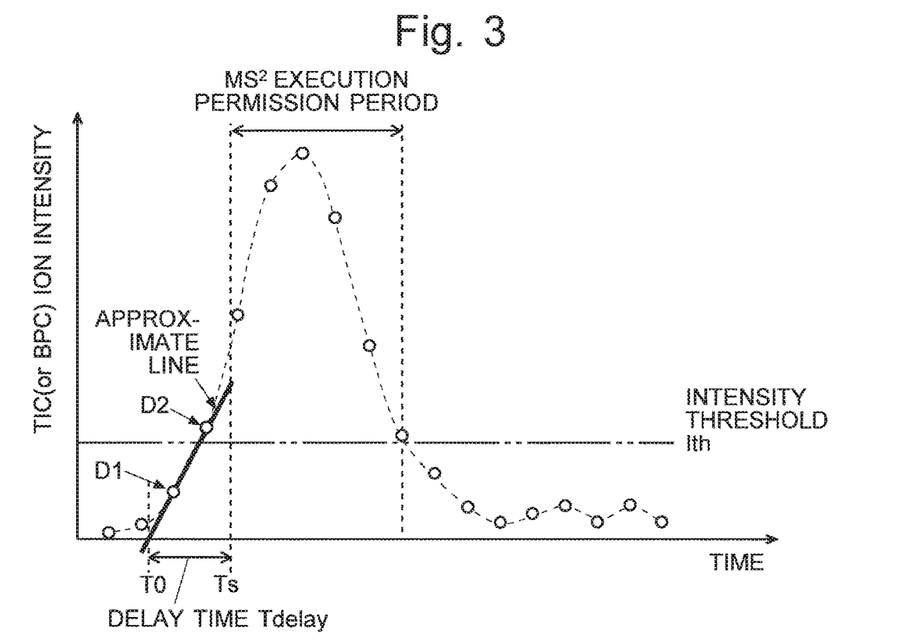
FIG. 3 is a chromatogram for explaining the precursor-ion selection process in the LC-MS in the present embodiment.
Figure 4A:
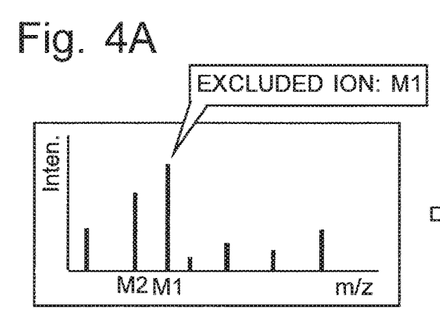
FIGS. 4A and 4B are mass spectra for explaining the precursor-ion selection process in the LC-MS in the present embodiment.
Figure 4B:
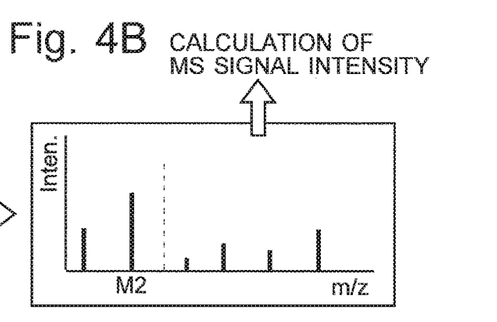

An operation in the process of collecting data by DDA in the LC-MS in the present embodiment is hereinafter described with reference to FIGS. 2-4B. FIG. 2 is a flowchart showing one example of the processing operation in the process of collecting data by DDA in the present LC-MS. FIG. 3 is a chromatogram for explaining the precursor-ion selection process in the LC-MS in the present embodiment. FIGS. 4A and 4B are mass spectra for explaining the precursor-ion selection process in the LC-MS in the present embodiment.

In advance of a measurement, a user (analysis operator) enters and sets various measurement conditions from the input unit 7. The control sequence creator 61 in the central control unit 6 creates a control sequence for performing the measurement based on the entered measurement conditions (Step S1). In the present example, the measurement conditions include the following items of information.

Separation conditions in the LC unit 1 (e.g. the kind of column, kind of mobile phase, flow velocity of the mobile phase, and gradient conditions in the case of a gradient analysis)

Mass-to-charge ratios of the ions that should not be selected as the precursor ion in the DDA (those ions are hereinafter called the "excluded ions")

Intensity threshold Ith to be used for the precursor-ion selection determination process, and detailed conditions used in the process of selecting the precursor ion (e.g. the mass-to-charge ratio of an ion which should be preferentially selected when it is present, as well as the order of priority for the selection of the precursor ion, such as the order of ion intensity or order of mass-to-charge ratio)

Execution conditions of the MS$^2$ analysis for the selected precursor ion (e.g. the mass-to-charge-ratio range in the MS$^2$ analysis, as well as the CID conditions, such as the collision energy and CID gas pressure)

The user issues a command to initiate the measurement. Upon receiving this command, the central control unit 6 sends the prepared control sequence to the analysis control unit 5 as well as sends a precursor-ion selection condition necessary for the precursor-ion selection determination process to the data-processing unit 4. In the data-processing unit 4, the precursor-ion selection condition is stored in the precursor-ion selection condition storage section 42. The analysis control unit 5 temporarily stores the control sequence in the control sequence storage section 51 and controls the operations of the relevant sections according to the control sequence. Thus, the measurement is initiated in the LC unit 1 and the mass spectrometer unit 2 (Step S2).

After the measurement is initiated, a measurement target sample is injected into the mobile phase in the LC unit 1, and the various components contained in the sample are sequentially eluted from the column 13, as described earlier. Meanwhile, in the mass spectrometer unit 2, a mass spectrometric analysis including neither the selection of the precursor ion nor the dissociation of the ions (this analysis may be hereinafter called the "MS measurement") is repeatedly performed at predetermined intervals of time. For each of those mass spectrometric analyses, time-of-flight spectrum data corresponding to a predetermined mass-to-charge-ratio range are sent to the data-processing unit 4. The spectrum data collector 40 in the data-processing unit 4 collects those time-of-flight spectrum data and converts the time of flight into mass-to-charge ratio to obtain mass spectrum data (Step S3).

Every time a set of data forming a mass spectrum over a predetermined mass-to-charge ratio is obtained, the precursor-ion selection determination processor 41 deletes, from the set of data, only the data corresponding to the excluded ions stored in the precursor-ion selection condition storage section 42, and calculates the signal intensity from a total ion current (TIC) or base peak current (BPC) using the remaining data (this signal intensity is hereinafter called the "MS signal intensity"; Step S4).

For example, consider the case where a set of data forming a mass spectrum as shown in FIG. 4A has been obtained by an MS measurement, while mass-to-charge ratio M1 has been set as an excluded ion. In this case, the data corresponding to the peak at mass-to-charge ratio M1 is deleted from the obtained mass spectrum data, regardless of the signal intensity of the peak concerned (see FIG. 4B). Then, the MS signal intensity is calculated from the rest of the mass spectrum data. In the case of using the MS signal intensity calculated from the TIC, the MS signal intensity can be calculated by adding the signal intensities of all peaks exclusive of the peak at mass-to-charge ratio M1. In the case of using the MS signal intensity calculated from the BPC, the MS signal intensity can be obtained by extracting the peak which has the highest signal intensity among the mass spectrum data remaining after the deletion of the peak at mass-to-charge ratio M1 (in FIG. 4B, the peak at mass-to-charge ratio M2), and determining the signal intensity of the extracted peak.

The precursor-ion selection determination processor 41 determines whether or not the calculated MS signal intensity is higher than the intensity threshold Ith which has been set as one of the measurement conditions (Step S5). If the intensity is not higher than the threshold (i.e. if the result is "No"), the operation proceeds to Step S13 to determine whether or not the current time has passed the ending time of the measurement. If "No" in Step S13, the operation returns to Step S3 to further continue the MS measurement.

If it is determined in Step S5 that the MS signal intensity is higher than the intensity threshold Ith, the MS$^2$ execution permission-beginning time Ts is calculated (Step S6). In the example of FIG. 3, the intensity threshold Ith is not exceeded when the MS signal intensity is D1, whereas the intensity threshold Ith is exceeded when an MS signal intensity of D2 is obtained in the next MS measurement. Accordingly, the determination result in Step S5 becomes "Yes" when this value of D2 has been obtained.

Specifically, in Step S6, the beginning time T0 of the peak on the chromatogram (this peak is hereinafter referred to as the "chromatogram peak" for distinction from the peak on the mass spectrum) is estimated based on the change in the MS signal intensity obtained earlier than the point in time concerned. For example, as shown in FIG. 3, the beginning time T0 of the chromatogram peak is determined by a linear approximation using the signal intensity value D2 at which the MS signal intensity has exceeded the intensity threshold as well as the signal intensity value D1 obtained in the previous MS measurement. Then, a predetermined delay time Tdelay is added to the beginning time T0 of the chromatogram peak determined in the previously described manner to determine the $MS^2$ execution permission-beginning time Ts.

Figure 5:
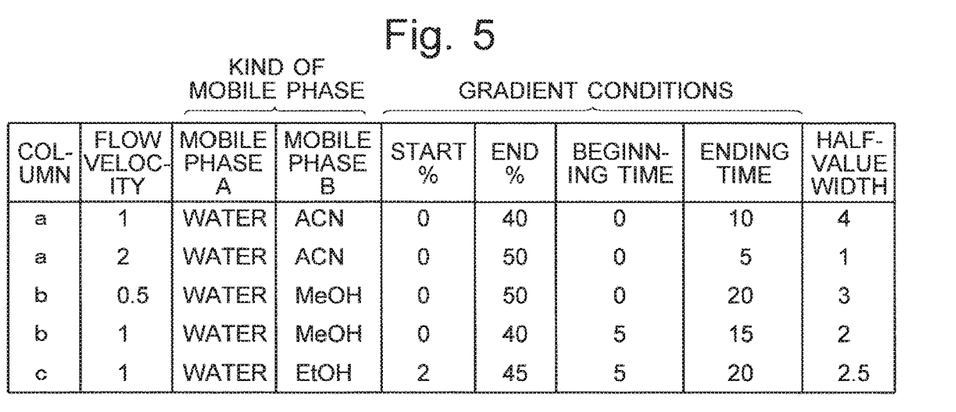
FIG. 5 is a table showing one example of the content of the half-value width database in the LC-MS in the present embodiment.

The delay time Tdelay corresponds to the period of time required for the chromatogram peak, which has a bell-like shape as shown by the dashed line in FIG. 3, to rise to a certain level. Therefore, the delay time is normally dependent on the peak width, or the half-value width of the peak. The half-value width of the peak significantly depends on the separation conditions in the LC unit 1. Accordingly, in the present embodiment, a set of information showing the correspondence between various LC separation conditions and standard (average) values of the half-value width is previously stored in the half-value width database 43. FIG. 5 shows one example of this information. In this example, the half-value width of the chromatogram peak is related to the kind of column to be used, flow velocity of the mobile phase, kind of mobile phase, gradient conditions and so on. For example, such information may be experimentally determined by the manufacturer providing the present device, or users may experimentally determine those values and create the database.

As described earlier, the LC separation conditions are entered as measurement conditions. Therefore, using the half-value-width database 43, the precursor-ion selection determination processor 41 determines the half-value width of the chromatogram peak corresponding to the set LC separation conditions and calculates the delay time Tdelay by multiplying the half-value width by a predetermined factor. For example, ½ may be used as the predetermined factor. The larger the peak width is, the longer the delay time Tdelay becomes. Accordingly, it is possible to appropriately choose the predetermined factor so that the $MS^2$ execution permission-beginning time Ts will be set at a point in time where the chromatogram peak reaches a sufficiently high level, regardless of the signal intensity value at the peak top of the peak concerned as well as the level of the intensity threshold Ith.

FIG. 2 is once more referred to for further descriptions. After the $MS^2$ execution permission-beginning time Ts has been calculated, whether or not the MS signal intensity calculated from the mass spectrum data obtained in the next MS measurement is higher than the intensity threshold Ith is determined (Steps S7 and S8). If the intensity is not higher than the threshold, the operation proceeds to Step S13 mentioned earlier. If it is determined in Step S8 that the MS signal intensity is higher than the intensity threshold Ith, whether or not the current time has passed the $MS^2$ execution permission-beginning time Ts calculated in Step S6 is determined (Step S9). If "No" in Step S9, the operation returns to Step S7 to repeat the processes of Steps S7-S9. During the repetition, when the determination result in Step S8 has changed to "No", the operation proceeds from Step S8 to S13.

If it is determined in Step S9 that the current time has passed the $MS^2$ execution permission-beginning time Ts, the precursor-ion selection determination processor 41 extracts an ion which satisfies the precursor-ion selection condition on the mass spectrum obtained by the MS measurement (Step S10). The information on the mass-to-charge ratio of the extracted ion is sent to the analysis control unit 5. Upon receiving this information, the analysis control unit 5 controls the mass spectrometer unit 2 to perform an $MS^2$ analysis in which the extracted ion selected as the precursor ion (Step S11). That is to say, only the precursor ion is selected by the quadrupole mass filter 31, and this precursor ion is dissociated by CID in the collision cell 32. The various product ions thereby generated are introduced into the time-of-flight mass analyzer 36 for mass spectrometry. Thus, a set of data forming an $MS^2$ spectrum over a predetermined mass-to-charge-ratio range is obtained. If a plurality of ions satisfying the precursor-ion selection condition have been extracted in Step S10, $MS^2$ analyses for those precursor ions are performed according to a previously set order of priority as much as time allows (e.g. within the period of time until the next MS measurement is carried out).

After the $MS^2$ analysis has been completed, whether or not the current time has passed the ending time of the measurement is determined (Step S12). If the current time has not reached the ending time of the measurement, the operation returns from Step S12 to S7. Once the MS signal intensity has exceeded the intensity threshold Ith, the MS measurement and the subsequent $MS^2$ analysis are performed by the repetition of the processes of Steps S7 through S12 will be repeated until the MS signal intensity becomes lower than the intensity threshold Ith (i.e. until the determination result in Step S8 becomes "No"). By such operations, $MS^2$ spectra for an ion which satisfies the precursor-ion selection condition can be assuredly obtained. The $MS^2$ analysis is not immediately performed after the MS signal intensity has exceeded a fixed threshold; the $MS^2$ analysis is carried out at or after the point in time where the chromatogram peak has risen to a sufficient level. Accordingly, satisfactory $MS^2$ spectra which show product ions with certain levels of signal intensity can be obtained.

If the measurement target sample contains a plurality of components, an eluate containing the components which have been temporally separated in the column 13 is sequentially introduced into the mass spectrometer unit 2. Therefore, $MS^2$ spectrum data can be obtained in the previously described manner for each component as long as any of the ions originating from the component satisfies the precursor-ion selection condition.

In the previous embodiment, it is not assumed that the half-value width of the chromatogram peak changes with the passage of time from the beginning point of the measurement. However, as is commonly known, the half-value width of the chromatogram peak in an isocratic analysis normally changes with the passage of time (see FIG. 7A). Therefore, if a single average value of the half-value width of the peak corresponding to the separation conditions in the LC unit 1 is simply used, the $MS^2$ execution permission-beginning time Ts may be inappropriately set and cause a problem, such as an $MS^2$ analysis being performed when the chromatogram peak has not yet risen to a sufficient level. Accordingly, in the case of performing an isocratic analysis, it is preferable to use a half-value width database in which the temporal change in the half-value width of the peak is reflected.

Figure 6:
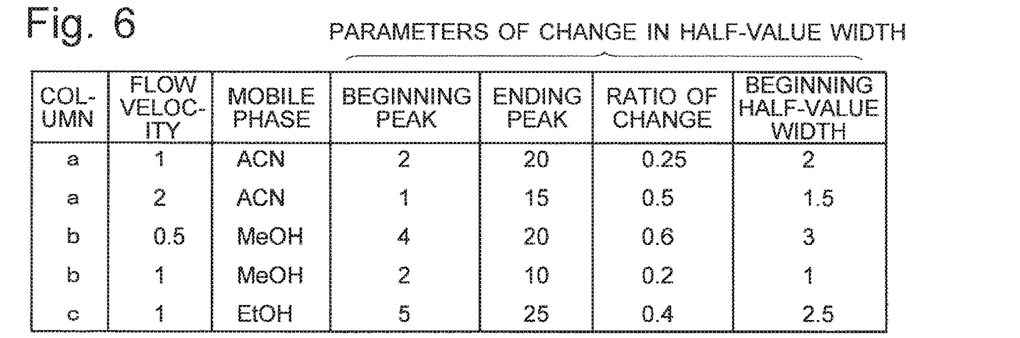
FIG. 6 is a table showing another example of the content of the half-value width database in the LC-MS in the present embodiment.
Figure 7A:
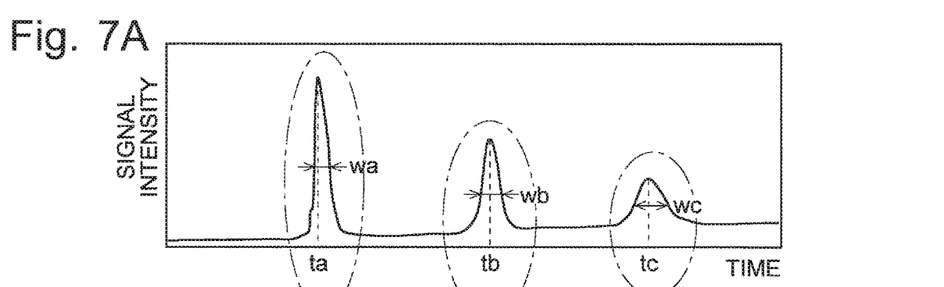
FIGS. 7A and 7B are diagrams illustrating a data-collecting operation in the process of creating the half-value width database shown in FIG. 6.
Figure 7B:
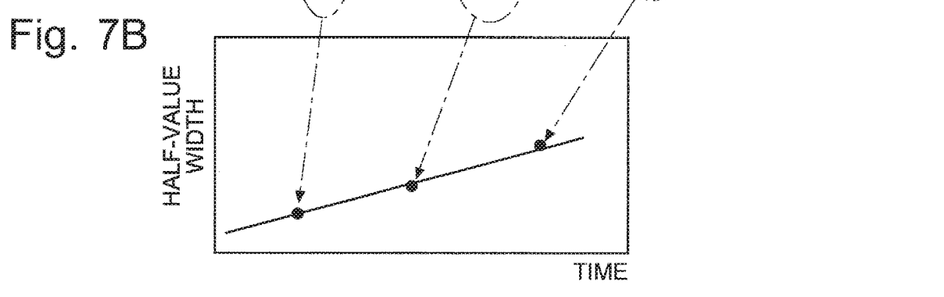

FIG. 6 shows one example of the information contained in the half-value width database 43 for an isocratic analysis. For example, if the width of the peaks observed on a chromatogram changes with the passage of time as shown in FIG. 7A, the relationship between the retention times and half-value widths of the peaks is previously determined as shown in FIG. 7B. Furthermore, the half-value width of the first peak and the ratios of the half-value widths of the subsequent peaks to that of the first peak are calculated. By creating a database of these values, it becomes possible to determine a standard value of the half-value width of the chromatogram peak corresponding to the separation conditions (the kind of column, etc.) and the retention time, and calculate the delay time Tdelay.

In these examples, the half-value width of a chromatogram peak can be obtained based on the half-value width database 43. It is also possible to allow users to manually enter and set the half-value width of the chromatogram peak as one of the measurement conditions. For example, such a manual entry and setting is useful in the case of operating the LC unit 1 under a special separation condition which is not registered in the half-value width database 43.

Normally, the waveform of a peak observed on a chromatogram obtained with an LC becomes close to a Gaussian distribution profile as long as there is no interfering factor, such as the overlap of components. Therefore, it is possible to estimate the half-value width of a peak by determining a peak waveform approximated by a Gaussian distribution waveform using a plurality of MS signal intensities, e.g. D1 and D2 in FIG. 3. In this manner, the half-value width of a peak on a chromatogram can be estimated from a plurality of MS signal intensities in the rising portion of the peak, and this half-value width of the peak can be used to calculate the delay time Tdelay.

In place of the previously described precursor-ion selection determination process, a process as will be hereinafter described may be performed to determine, as the $MS^2$ execution permission-beginning time Ts, a point in time which is delayed by an appropriate length of time from the point in time where the MS signal intensity has exceeded the intensity threshold Ith.

Figure 8:
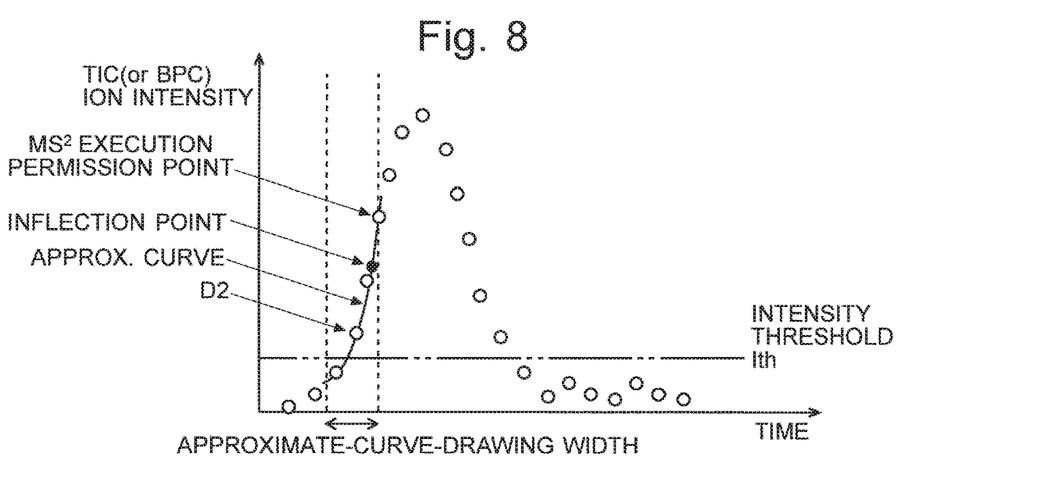
FIG. 8 is a chromatogram showing another example of the precursor-ion selection process.

FIG. 8 is one example of a chromatogram for explaining this process. In this process, at or after the point in time where the MS signal intensity has exceeded the intensity threshold Ith (where the data D2 in FIG. 8 has been obtained), an approximate curve (e.g. a quadratic or cubic curve) is continuously drawn by a smoothing process based on the aforementioned MS signal intensity and one or more MS signal intensities obtained earlier. Then, the differential value at the current point on the approximate curve is calculated, and an inflection point on the approximate curve is determined using the differential value. When the inflection point has been located, the first data acquisition point which follows the inflection point is designated as the $MS^2$ execution permission-beginning time Ts, and the DDA is initiated.

In the example shown in FIG. 8, an approximate quadratic curve ($y=Ax^2+Bx+C$) is continuously drawn by a smoothing process based on a plurality of MS signal intensities within a predetermined time width ("approximate-curve-drawing width") tracing back from the MS signal intensity obtained at or after the point in time where the MS signal intensity has exceeded the intensity threshold Ith. Then, the differential value ($d^2y/dx^2$) at each point in time is calculated on the approximate quadratic curve. The first point in time at which the differential value becomes equal to or greater than zero is identified as the inflection point, and the first data acquisition point after the inflection point is designated as the $MS^2$ execution permission-beginning time Ts. Normally, the detection of an inflection point on a chromatogram curve is performed to extract a chromatogram peak after a set of data has been acquired. Therefore, in most cases, the approximate-curve-drawing width used for detecting the inflection point is determined so as to span a certain width of time before and after the inflection point, with its width defined by the half-value width of the expected chromatogram peak. In the case of the data processing in the present example, the approximate-curve-drawing width is defined only within a range that temporally precedes the inflection point. Accordingly, for example, it is appropriate to use, as the approximate-curve-drawing width, a value that is equal to one half of the half-value width of the expected chromatogram peak.

In the precursor-ion selection determination process in the LC-MS according to the previous embodiment, the beginning point of the chromatogram peak is estimated, and the point in time at which the predetermined delay time Tdelay elapses from the beginning point is designated as the $MS^2$ execution permission-beginning time Ts. In place of the beginning point of the chromatogram peak, the first point in time at which the MS signal intensity exceeds the intensity threshold Ith may be used as the reference point, and the point in time at which the predetermined delay time Tdelay elapses from that reference point may be designated as the $MS^2$ execution permission-beginning time Ts. In this case, the factor by which the half-value width of the expected chromatogram peak is multiplied for the calculation of the delay time should be changed from the one used in the previous embodiment. Such a configuration also enables an $MS^2$ analysis to be performed at a point in time where the chromatogram peak has risen to a sufficiently high level reflecting the height and width of the same peak, so that a satisfactory $MS^2$ spectrum can be assuredly obtained.

In the LC-MS in the previous embodiment, a Q-TOF mass spectrometer is used as the mass spectrometer unit 2. Needless to say, a triple quadrupole mass spectrometer may be used in place of the Q-TOF mass spectrometer.

In place of a mass spectrometer in which ions are dissociated in a collision cell, a device which temporarily stores ions and dissociates the stored ions may be used, such as an ion trap mass spectrometer or ion trap time-of-flight mass spectrometer. Such a device is capable of not only an $MS^2$ analysis but also an $MS^n$ analysis with n being equal to or greater than three. The previously described precursor-ion selection determination process is also applicable in such an $MS^n$ analysis.

Furthermore, the LC unit 1 may be configured for a flow injection analysis (FIA) in which the measurement target sample is injected from the injector 12 into the mobile phase without using a column, and the same sample is carried by the flow of the mobile phase into the mass spectrometer unit 2.

Understandably, the present invention is also applicable in a GC-MS in place of an LC-MS.

Any of the previous embodiment and variations is a mere example of the present invention, and any change, addition or modification appropriately made within the scope of the present invention in any aspect other than those already described will evidently fall within the scope of claims of the present application.

REFERENCE SIGNS LIST

1 . . . LC Unit
10 . . . Mobile Phase Container
11 . . . Liquid-Sending Pump
12 . . . Injector
13 . . . Column
2 . . . Mass Spectrometer Unit
20 . . . Chamber
21 . . . Ionization Chamber 22 . . . First Intermediate Vacuum Chamber
23 . . . Second Intermediate Vacuum Chamber
24 . . . First Analysis Chamber
25 . . . Second Analysis Chamber
26 . . . ESI Spray
27 . . . Desolvation Tube
28, 35 . . . Ion Guide
29 . . . Skimmer
31 . . . Quadrupole Mass Filter
32 . . . Collision Cell
33 . . . Multipole Ion Guide
34 . . . Ion Passage Hole
36 . . . Time-of-Flight Mass Analyzer
361 . . . Orthogonal Accelerator
362 . . . Flight Space
363 . . . Reflector
37 . . . Ion Detector
4 . . . Data-Processing Unit
40 . . . Spectrum Data Collector
41 . . . Precursor-Ion Selection Determination Processor
42 . . . Precursor-Ion Selection Condition Storage Section
43 . . . Half-Value Width Database
5 . . . Analysis Control Unit
51 . . . Control Sequence Storage Section
6 . . . Central Control Unit
61 . . . Control Sequence Creator
7 . . . Input Unit
8 . . . Display Unit

The invention claimed is:

1. A mass spectrometer which determines a precursor ion based on $MS^{n-1}$ spectrum data obtained by an $MS^{n-1}$ analysis (where n is an integer equal to or greater than two) and performs an $MS^n$ analysis for the precursor ion subsequently to the $MS^{n-1}$ analysis, where a concentration of a component contained in a sample changes in a peak-like form with the passage of time when the sample is introduced, the mass spectrometer comprising:
   a) a condition setter for allowing an analysis operator to set a precursor-ion selection condition;
   b) a time determiner for determining a permission-beginning time at which permission to perform an $MS^n$ analysis for a component being analyzed at the time is given based on $MS^{n-1}$ spectrum data obtained by an $MS^{n-1}$ analysis during an execution of the analysis;
   c) a time checker for comparing a current time with the permission-beginning time; and
   d) a precursor ion selector for selecting, as a precursor ion, a peak which meets the precursor-ion selection condition from the $MS^{n-1}$ spectrum data obtained by the $MS^{n-1}$ analysis, after it is determined by the time checker that the current time exceeds the permission-beginning time; and
   e) an analysis controller for controlling each relevant section to perform the $MS^n$ analysis for the precursor ion selected by the precursor ion selector, wherein
   the time determiner comprises a peak-beginning point estimator for estimating a beginning point of a peak on a chromatogram which corresponds to a peak-like change of the concentration of the contained component with the passage of time based on data of a plurality of $MS^{n-1}$ spectra continuously obtained in temporal sequence, and designate, as the permission-beginning time, a point in time at which a predetermined delay time elapses from the beginning point of the peak.

2. The mass spectrometer according to claim 1, wherein:
   the time determiner determines the delay time based on an estimated value of a half-value width of the peak on the chromatogram.

3. The mass spectrometer according to claim 2, wherein:
   a chromatograph is connected to a front end of the mass spectrometer; and
   the time determiner further comprises a half-value width estimator for estimating the half-value width of the peak on the chromatogram based on a separation condition in the chromatograph.

4. The mass spectrometer according to claim 2, wherein:
   the time determiner further comprises a half-value width estimator for estimating the half-value width of the peak on the chromatogram based on data of a plurality of $MS^{n-1}$ spectra.

5. The mass spectrometer according to claim 1, wherein:
   the peak-beginning point estimator estimates the peak-beginning point when a signal intensity calculated based on the $MS^{n-1}$ spectrum data exceeds a predetermined threshold, based on the signal intensity concerned as well as one or more signal intensities calculated based on earlier $MS^{n-1}$ spectrum data.

6. The mass spectrometer according to claim 1, wherein:
   the time determiner estimates a curve of a rising portion of a peak on a chromatogram which corresponds to a peak-like change of the concentration of the contained component with the passage of time based on data of a plurality of $MS^{n-1}$ spectra continuously obtained in temporal sequence, locates an inflection point on the curve, and designates a point in time of the inflection point as the permission-beginning time.

7. The mass spectrometer according to claim 1, wherein:
   the precursor-ion selection condition includes, as one item, excluded ion information which shows an ion or mass-to-charge ratio to be excluded; and
   the time determiner determines the permission-beginning time after excluding data corresponding to the excluded ion information from $MS^{n-1}$ spectrum data obtained by an $MS^{n-1}$ analysis.

8. The mass spectrometer according to claim 1, wherein:
   the precursor-ion selection condition includes, as one item, excluded ion information which shows an ion or mass-to-charge ratio to be excluded; and
   the time determiner determines the permission-beginning time after excluding data corresponding to the excluded ion information from $MS^{n-1}$ spectrum data obtained by an $MS^{n-1}$ analysis.

9. The mass spectrometer according to claim 2, wherein:
   the precursor-ion selection condition includes, as one item, excluded ion information which shows an ion or mass-to-charge ratio to be excluded; and
   the time determiner determines the permission-beginning time after excluding data corresponding to the excluded ion information from $MS^{n-1}$ spectrum data obtained by an $MS^{n-1}$ analysis.

10. The mass spectrometer according to claim 3, wherein:
    the precursor-ion selection condition includes, as one item, excluded ion information which shows an ion or mass-to-charge ratio to be excluded; and
    the time determiner determines the permission-beginning time after excluding data corresponding to the excluded ion information from $MS^{n-1}$ spectrum data obtained by an $MS^{n-1}$ analysis.

11. The mass spectrometer according to claim 4, wherein:
    the precursor-ion selection condition includes, as one item, excluded ion information which shows an ion or mass-to-charge ratio to be excluded; and the time determiner determines the permission-beginning time after excluding data corresponding to the excluded ion information from $MS^{n-1}$ spectrum data obtained by an $MS^{n-1}$ analysis.

12. The mass spectrometer according to claim 5, wherein:
the precursor-ion selection condition includes, as one item, excluded ion information which shows an ion or mass-to-charge ratio to be excluded; and
the time determiner determines the permission-beginning time after excluding data corresponding to the excluded ion information from $MS^{n-1}$ spectrum data obtained by an $MS^{n-1}$ analysis.

13. The mass spectrometer according to claim 6, wherein:
the precursor-ion selection condition includes, as one item, excluded ion information which shows an ion or mass-to-charge ratio to be excluded; and
the time determiner determines the permission-beginning time after excluding data corresponding to the excluded ion information from $MS^{n-1}$ spectrum data obtained by an $MS^{n-1}$ analysis.

\* \* \* \* \*